(12) United States Patent
White (10) Patent No.: US 6,963,292 B1
(45) Date of Patent: Nov. 8, 2005

(54) SYSTEM AND METHOD FOR REPORTING EMERGENCIES FROM AN AIRCRAFT

(75) Inventor: Brian H. White, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 293 days.

(21) Appl. No.: 10/146,155

(22) Filed: May 15, 2002

(51) Int. Cl.$^7$ ............................................. G08B 23/00
(52) U.S. Cl. ................. 340/963; 340/426.12; 340/945; 701/3; 713/200
(58) Field of Search ................................ 340/963, 937, 340/988, 945, 541, 990, 426.12, 825.72; 701/3, 2, 36; 244/118.5; 713/200

(56) References Cited

U.S. PATENT DOCUMENTS

| | | | | |
|---|---|---|---|---|
| 3,704,845 | A * | 12/1972 | Ord .............................. | 244/121 |
| 5,531,402 | A * | 7/1996 | Dahl ........................... | 244/75 R |
| 6,499,693 | B1 * | 12/2002 | Rogson ..................... | 244/118.5 |
| 6,545,601 | B1 * | 4/2003 | Monroe ....................... | 340/521 |
| 6,584,383 | B2 * | 6/2003 | Pippenger ....................... | 701/3 |
| 6,641,087 | B1 * | 11/2003 | Nelson ...................... | 244/118.5 |
| 6,676,078 | B2 * | 1/2004 | Cordina et al. ........... | 244/118.5 |
| 6,696,928 | B1 * | 2/2004 | Boveja et al. .......... | 340/426.12 |
| 6,812,859 | B2 * | 11/2004 | Lay ............................. | 340/945 |
| 6,816,087 | B2 * | 11/2004 | Lane ........................... | 340/945 |
| 2003/0052798 | A1 * | 3/2003 | Hanson ....................... | 340/945 |
| 2003/0139959 | A1 * | 7/2003 | Sabouni ......................... | 705/8 |

* cited by examiner

*Primary Examiner*—Davetta W. Goins (57) ABSTRACT

A system and method is provided for passenger reporting of emergencies aboard an aircraft. An exemplary aircraft security system may have a panic device accessible to and activated by a passenger who may be seated. The panic device may be within a passenger compartment of an aircraft, and a wireless interface associated with the aircraft may respond to activation of the panic device by transmitting an emergency signal outside of the aircraft. The emergency signal may be indicative of panic data and/or aircraft data determined within the aircraft. The panic data may indicate the presence of an emergency within the aircraft, and the aircraft data may include the status of aircraft systems, telemetry data, and media transmission of the passenger compartment. The panic data and/or aircraft data may be extracted from the emergency signal and sent to authorities.

34 Claims, 4 Drawing Sheets

SYSTEM AND METHOD FOR REPORTING EMERGENCIES FROM AN AIRCRAFT

BACKGROUND OF THE INVENTION

1. Field of the Invention

The present invention pertains generally to aircraft security and more particularly to a system and method for passenger reporting of aircraft emergencies.

2. Description of Related Art

Currently, a seated passenger aboard an airline may activate a call button that notifies a flight attendant of a passenger's need for service, as described in U.S. Pat. No. 6,177,887, the contents of which are incorporated in its entirety herein by reference. In addition, seated passengers may use in-flight entertainment systems as described in U.S. Pat. No. 5,311,302, the contents of which are incorporated in its entirety herein by reference. Further, public telephones such as in-flight phones are also known to be used in passenger airlines.

SUMMARY

A system, method, and device for reporting an emergency aboard an aircraft are provided. In an aspect of an exemplary embodiment, an aircraft security system may include a panic device that is accessible to and activated by a passenger. Further, the panic device may be within a passenger compartment of an aircraft. A wireless interface associated with the aircraft may respond to activation of the panic device by transmitting an emergency signal outside of the aircraft.

In another aspect of the present embodiment, a method for reporting an emergency on an aircraft may include activating a panic device by a seated passenger within a passenger compartment of the aircraft. The method may further include transmitting an emergency signal outside of the aircraft in response to the seated passenger activating the panic device. Additionally, the emergency signal may be indicative of panic data sent from the panic device.

In yet another aspect of the present embodiment, a panic device for use in an aircraft may include a selection mechanism activated by a seated passenger during an emergency. Further, the panic device may include a transmitter that receives panic data indicating the emergency from the selection mechanism. In addition, the transmitter may send the panic data to a control device.

DETAILED DESCRIPTION

I. Exemplary Aircraft Security System

Figure 1:
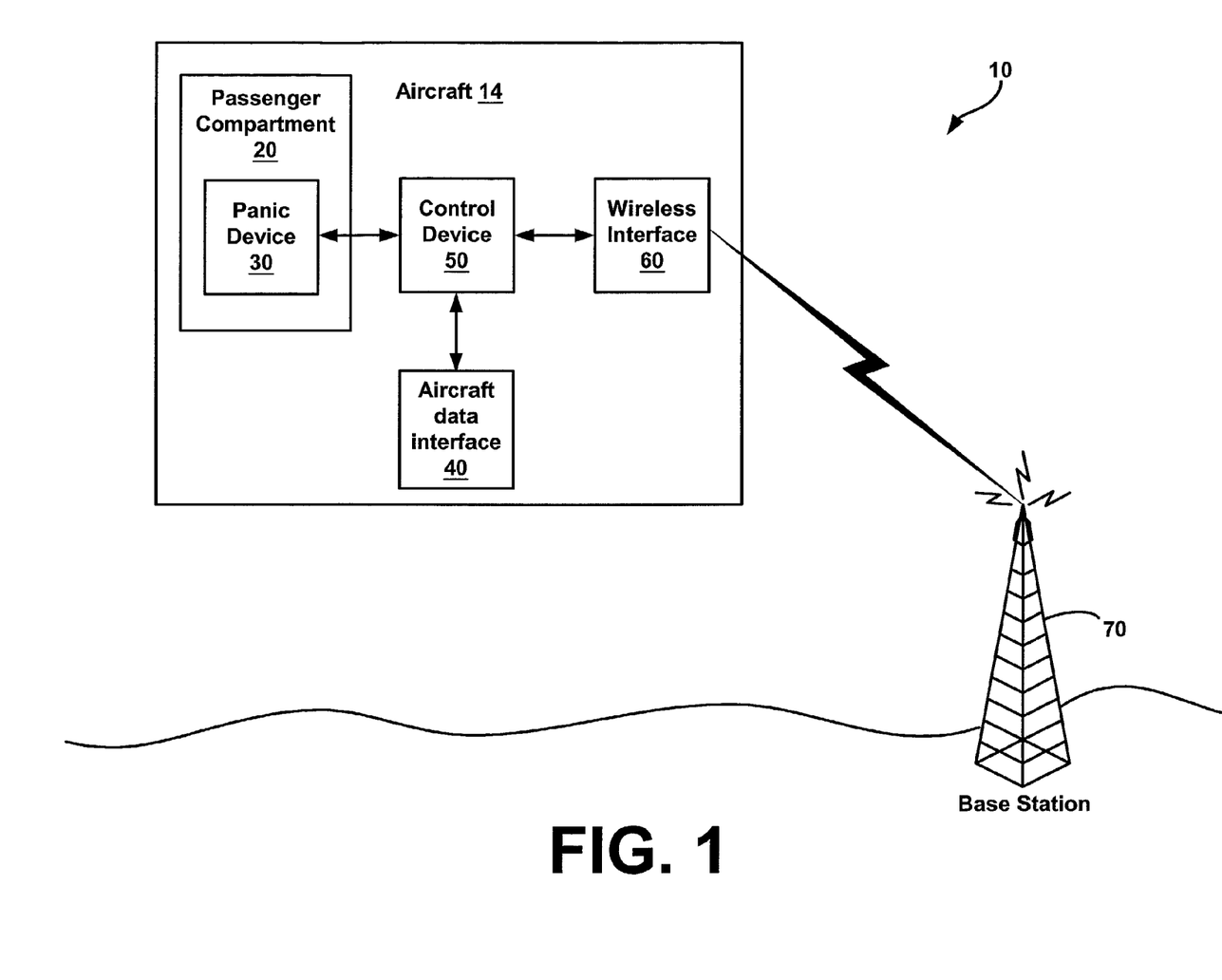
FIG. 1 is a block diagram of an exemplary aircraft security system.

Turning now to the drawings, FIG. 1 shows an exemplary embodiment of an aircraft security system 10 having an aircraft 14 in wireless communication with a base station 70. The aircraft 14 may have a passenger compartment 20 that includes a panic device 30. The aircraft may also include an aircraft data interface 40, control device 50, and wireless interface 60. The panic device 30 and the aircraft data interface 40 may be in communication with the control device 50. Additionally, the control device 50 may be in communication with the wireless interface 60, which may transmit wireless signals (e.g., code division multiple access (CDMA) signals, time division multiple access (TDMA) signals, 802.11 signals) to the base station 70. It should be understood that many of the elements described and illustrated throughout this specification are functional in nature and may be embodied in one or more physical entities or may take other forms beyond those described or depicted.

A. Exemplary Aircraft

The aircraft 14 may be any type of machine capable of atmospheric flight, such as an airplane, helicopter, or dirigible. In an exemplary embodiment, the aircraft 14 may be a commercial airliner that transports passengers between different locations. During flight, the passengers may be located within the passenger compartment 20, which may be separate from other parts of the aircraft 14 (e.g., cockpit, galley, baggage storage area). The panic device 30 may be located within the passenger compartment 20, and may be accessible to and activated by a passenger. Preferably, the passenger may activate the panic device 30 to indicate that an emergency is present aboard the aircraft 14.

B. Exemplary Panic Device

Figure 2:
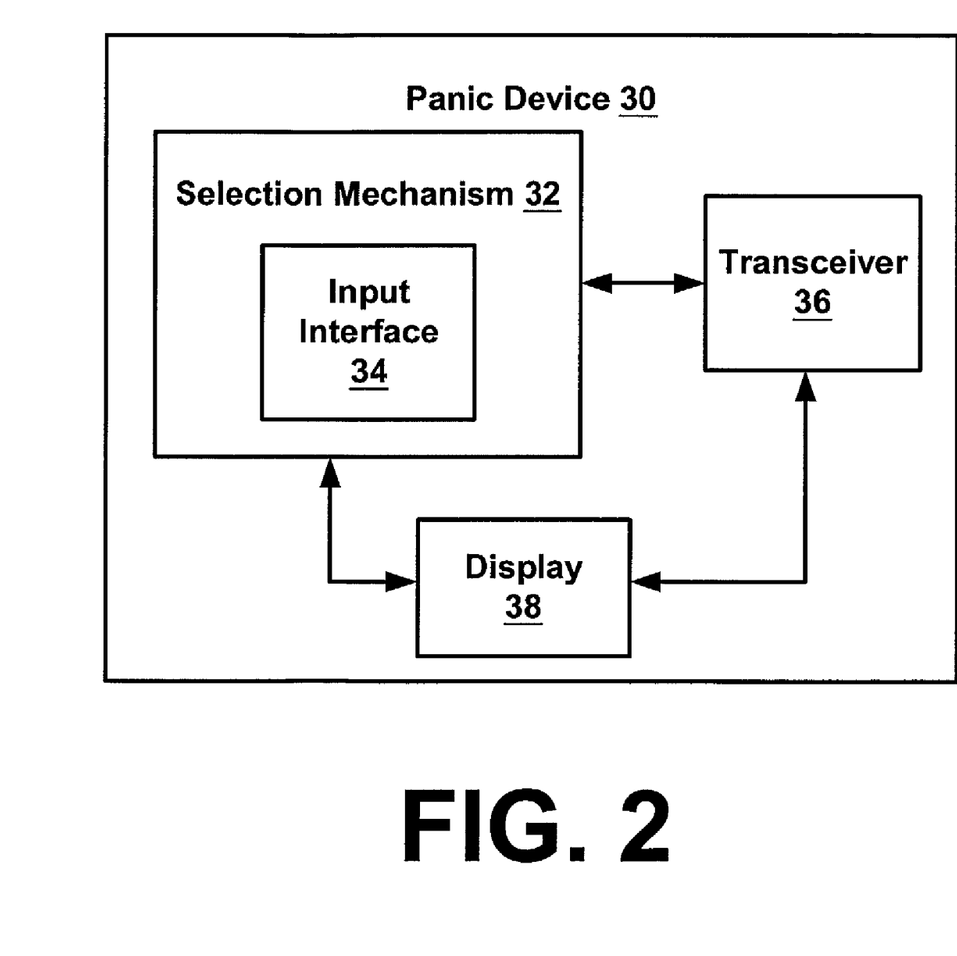
FIG. 2 is a more detailed block diagram of a panic device for use in the aircraft security system of FIG. 1.

Turning now to FIG. 2, the exemplary panic device 30 is shown in more detail. In the present embodiment, the panic device 30 may be associated with a seat within the passenger compartment 20. Although only one panic device 30 is shown in FIGS. 1 and 2, multiple panic devices may alternatively be utilized. For example, the aircraft 14 may include a panic device 30 for each passenger, seat, or row of seats within the passenger compartment 20. Furthermore, any number of panic devices may be networked together or connected separately to the control device 50, depending on consumer and/or manufacturing preferences. Exemplary locations for the panic device 30 within the passenger compartment 20 will be described in more detail later.

i. Exemplary Selection Mechanism

The panic device 30 shown in FIG. 2 may include a selection mechanism 32 having a plurality of possible selection states (e.g., "on" and "off"). In the present embodiment, an "off" selection state may be a default state that indicates that no emergency is present aboard the aircraft 14. A passenger, who may be seated, may activate the selection mechanism 32, thus changing the selection state to "on", to indicate that an emergency is present on the aircraft 14. Any number of different types of mechanical and/or electronic devices may be used for the selection mechanism 32, such as a button, switch, knob, or dial.

ii. Exemplary Input Interface

Additionally, or alternatively, the selection mechanism 32 may include an input interface 34, which may be used by a passenger to input data into the panic device 30. The input interface 34 may include any type of input device, such as a keyboard, touch-screen display, or mouse. Further, the input interface 34 may include a wireless receiver that enables the passenger to wirelessly communicate with the panic device 30 (e.g., via a cellular phone).

iii. Exemplary Panic Data

In the present embodiment, the data entered into the panic device 30 via the selection mechanism 32 and/or input interface 34 may be called "panic data". The panic data may indicate that the panic device 30 has been activated and that an emergency is present on the aircraft 14. Further, the panic data may indicate the location of the activated panic device 30 by identifying a seat associated with the panic device 30 (e.g., by using a seat number). Additionally, the panic data may include the time and date of activation of the panic device 30. Other components within the aircraft security system (e.g., the base station 70) may add information to the panic data, such as the time and date they receive the panic data.

Additionally, the panic data may include more information about the type of emergency aboard the aircraft 14. For example, a passenger may select from a pre-determined menu provided by the input interface 34 (e.g., touch screen display) that lists possible types of emergencies aboard the aircraft 14. The menu may include emergencies such as a bomb threat, a hijacking event, a pilot disabled, a passenger injury, a crew injury, a death, a request for medical attention, and a weapon threat. Thus, the passenger may select the emergency that best describes the situation aboard the aircraft 14, and this information may be included within the panic data. It should be understood that any number of other emergency types not described here may also be included within the menu.

iv. Exemplary Transceiver

In addition, the panic device 30 may include a transceiver 36 for sending the panic data to the control device 50. The transceiver 36 may also receive other data from the control device 50, as will be described later. The communication between the transceiver 36 and the control device 50 may utilize a wireless connection (e.g., CDMA air interface) or a physical connection (e.g., standard copper wire), depending on the desired functionality of the aircraft security system 10. Further, the transceiver 36 may include any type of transmitting and/or receiving device that may be integral or separate to the input interface 34. It should be understood that in alternate embodiments, the transceiver 36 may include a transmitting device without having a corresponding receiving component.

v. Exemplary Display

Furthermore, in the present embodiment, the panic device 30 may include a display 38, which may be any type of visual display known in the art, such as a video graphics array (VGA) monitor, liquid crystal display (LCD), or light emitting diode (LED) display. The display 38 may enable a passenger to see panic data that he/she has entered into the panic device 30. The display 38 may also enable the passenger to see whether the transfer of the panic data to the control device 50 or other components was successful. Additionally, as will be described later, information and/or instructions from authorities on the ground may be sent back to the panic device 30 and displayed for the passenger on the display 38. Further, the display 38 may be integrated with the selection mechanism 32 and/or input interface 34 in an alternate embodiment via a mechanism such as a touch-screen display or handwriting recognition area.

Additionally, in another exemplary embodiment, the panic device 30 may be integrated within a computer operated passenger entertainment system. Alternatively, the panic device 30 may be integrated within an in-flight telephone or entertainment system. In such embodiments, the display 38 may provide the passenger with a menu listing possible types of emergencies present aboard the aircraft 14. Accordingly, a passenger may enter panic data via the input interface 34 (e.g. touch screen display, handwriting recognition area, keypad) by selecting an item from the menu. The panic data may further include the passenger's comments or a description of events that are occurring aboard the aircraft 14.

vi. Exemplary Inadvertent Activation Prevention Mechanism

Furthermore, the panic device 30 may include an inadvertent activation prevention mechanism (not shown) to reduce the chance of inadvertent activation of the panic device 30. For example, a passenger may have to perform a plurality of actions before activation of the panic device 30 is initiated, such as by turning a knob and pushing a button on the selection mechanism 32. Alternatively, inadvertent activation may be avoided by utilizing a time delay mechanism with the panic device 30. For example, a passenger may have to push and hold the selection mechanism 32 (e.g., button) for a pre-determined amount of time (e.g., 5 seconds) before the panic device 30 is activated. In another embodiment, a passenger may have to enter a personal identification number (PIN) and/or password through the input interface 34 before the panic device 30 is activated. It should be noted that a variety of other types of inadvertent activation prevention mechanisms may also be used with the present embodiment.

C. Exemplary Panic Indicator

In addition, the aircraft security system 10 may include a panic indicator (not shown) in communication with the panic device 30. The panic indicator may notify a crewmember (e.g., pilot) within the cockpit or other portion of the aircraft 14 when the panic device 30 has been activated. Any type of indicating mechanism may be used with the panic indicator, such as a flashing light or audio alarm. Additionally, the panic indicator may indicate the seat number associated with the activated panic device 30, as well as other information about the passenger assigned to the seat associated with the panic device 30 (e.g., the passenger's name).

However, if an emergency involves a hijacking of the aircraft 14, the panic indicator may be prevented from indicating the activation of the panic device 30 so that the hijackers do not realize that an emergency signal is being transmitted. A possible hijacking may be detected in a number of different ways, such as if the aircraft 14 veers away from its intended flight plan, or if the passenger uses the input interface 34 to identify the emergency as a hijacking.

D. Exemplary Aircraft Data Interface and Aircraft Data

Turning back to FIG. 1, the aircraft data interface 40 may provide the control system 50 with data concerning the status and operation of the aircraft 14. This data may be hereinafter referred to as "aircraft data". In an exemplary embodiment, the aircraft data interface 40 may monitor the status of mechanical and/or electrical subsystems of the aircraft 14, and the navigation and orientation of the aircraft 14. Additionally, the aircraft data interface 40 may also receive media transmissions (e.g., video or audio recordings) of the passenger compartment 20. It should be understood that in alternate embodiments, the aircraft data interface 40 may be omitted from the aircraft security system 10, or that the functions performed by the aircraft data interface 40 may performed by any number of separate components.

i. Exemplary Monitoring of the Status of Mechanical and Electrical Subsystems

In the present embodiment, the aircraft data interface 40 may be in communication with any number of mechanical and/or electrical subsystems within the aircraft 14. The aircraft data interface 40 may receive messages generated by these subsystems and thus monitor their status. Further, the aircraft data interface 40 may include a computing processor, memory, and communication interface (components not shown) for receiving and processing these messages. The aircraft data interface 40 may combine the information contained within these messages to form aircraft data, and the aircraft data may be forwarded to the control device 50. Any number of mechanical and/or electrical subsystems may communicate with the aircraft data interface 40, such as fuel, engine, computer, navigation, GPS, radar, transponder, communication, radio, power generation and distribution, flight control surfaces, wing and rudder controls, hydraulics, avionics, flight management, or landing gear subsystems.

Additionally, serious problems occurring within an aircraft subsystem may be communicated from that subsystem to the aircraft data interface 40. These problems may be communicated via messages that are automatically generated based on the execution of self-test procedures on equipment commonly known as BITE (Built In Test Equipment), which may include any type of sensing device. Any type of problem with an aircraft subsystem may be communicated to the aircraft data interface 40, such an indication of decompression, a sudden loss of altitude, an automatic pilot disengagement or engagement, or an explosion.

ii. Exemplary Monitoring of Aircraft Navigation and Telemetry Data

As mentioned previously, the aircraft data interface 40 may be used to monitor the navigation and orientation of the aircraft 14. In an exemplary embodiment, the aircraft data interface 40 may receive telemetry data from the navigation subsystem of the aircraft 14 in response to activation of the panic device 30. The telemetry data may include information related to the position and movement of the aircraft 14, such as a location coordinate of the aircraft 14, the orientation and routing of the aircraft 14, the horizontal and vertical velocity of the aircraft 14, the origination and destination of the aircraft 14, and the altitude of the aircraft 14. The telemetry data may be determined within the navigation subsystem, which may include a Global Positioning System (GPS) and/or aircraft instruments such as an altimeter and air speed indicator. The telemetry data may then be included within the aircraft data that is sent to the control device 50.

iii. Exemplary Monitoring of Media Transmissions

Media transmissions, such as audio and video signals monitoring the events in the passenger compartment 20 of the aircraft 14, may also be received by the aircraft data interface 40. In an exemplary embodiment, media devices such as video cameras or microphones may be mounted in the passenger compartment 20 and used to record real-time events. The media transmissions may then be included within the aircraft data sent to the control device 50.

Media transmissions of the passenger compartment 20 may be advantageous during a hijacking or terrorist attack on the aircraft 14. In such a scenario, the media devices recording the media transmissions may be sufficiently hidden or protected as to prevent hijackers or other such individuals from locating and destroying these devices. Furthermore, as will be described later, the use of media transmissions may allow authorities on the ground to determine if a "false alarm" was triggered, or whether a real emergency is present. Thus, the media transmissions along with other information gathered by the authorities may be used to prevent the needless deployment of emergency resources in the case of a false alarm.

E. Exemplary Control Device

The control device 50 may receive panic data and aircraft data from the panic device 30 and the aircraft data interface 40, respectively. The control device 50 may then forward the panic data and aircraft data to the wireless interface 60. Alternatively, the control device 50 may process the panic data and aircraft data (e.g., combine data, convert data to a different format, etc.) before forwarding the data to the wireless interface 60. Any number of different types of mechanisms may be used for the control device 50, such as a computer chip, buffer, logic gates or other devices that may combine and/or process data streams. It should be understood that in alternate embodiments, the control device 50 may be omitted from the aircraft security system 10.

In addition, the control device 50 may count the number of panic devices that are activated in response to an emergency within a pre-defined period of time (e.g., 3 minutes). The number of panic device activations may indicate the level of urgency of the emergency, and this information may be included within the panic data that is transmitted to the wireless interface 60. It should be noted that the determination of the number of activated panic devices may be performed by the panic devices themselves or within other components within the aircraft security system 10.

F. Exemplary Wireless Interface

As described previously, the wireless interface 60 may receive panic data and/or aircraft data from the control device 50. Furthermore, the wireless interface 60 may transmit an emergency signal indicative of the panic data and/or aircraft data to the base station 70 in response to the activation of the panic device 30. Any type of wireless technology may be used with the emergency signal, such as a CDMA air interface, time division multiple access (TDMA) air interface, or 802.11 signals.

Furthermore, the wireless interface 60 may be any type of wireless transmitting and/or receiving station, such as a radio transceiver or a specially configured Personal Communications Services (PCS) mobile transceiver. Additionally, the location of the wireless interface 60 may vary depending on consumer and/or manufacturing preferences. For example, the wireless interface 60 may be located either in or on the aircraft (e.g., within the passenger compartment 20, in a cargo area of the aircraft 14, on the underside of the aircraft 14).

G. Exemplary Base Station

In the present embodiment, the base station 70 may be any type of data receiving and/or transmitting device, such as a PCS base station, 802.11 access point, or Bluetooth access point. Further, the base station 70 may include a built-in transceiver (e.g., antenna) and controller that are adapted to communicate with the control device 50 via the wireless interface 60. The transceiver for the base station 70 may utilize a specific radiation pattern for transmitting and receiving signals from the aircraft 14 while minimizing interference with other ground base stations and mobile stations. Also, communication between the wireless interface 60 and the base station 70 may utilize any type of encryption known in the art.

Additionally, the base station 70 may in communication with any number of other base stations in order to form a base station network. The base station 70 may also communicate with a base station controller (BSC), which may in turn communicate with a mobile switching center (MSC). The MSC may further communicate with a Public Switched Telephone Network (PSTN), through which data (e.g., panic data and aircraft data) may be forwarded to authorities. It should be understood that more or fewer components than described here may be in communication with the base station 70.

Figure 3:
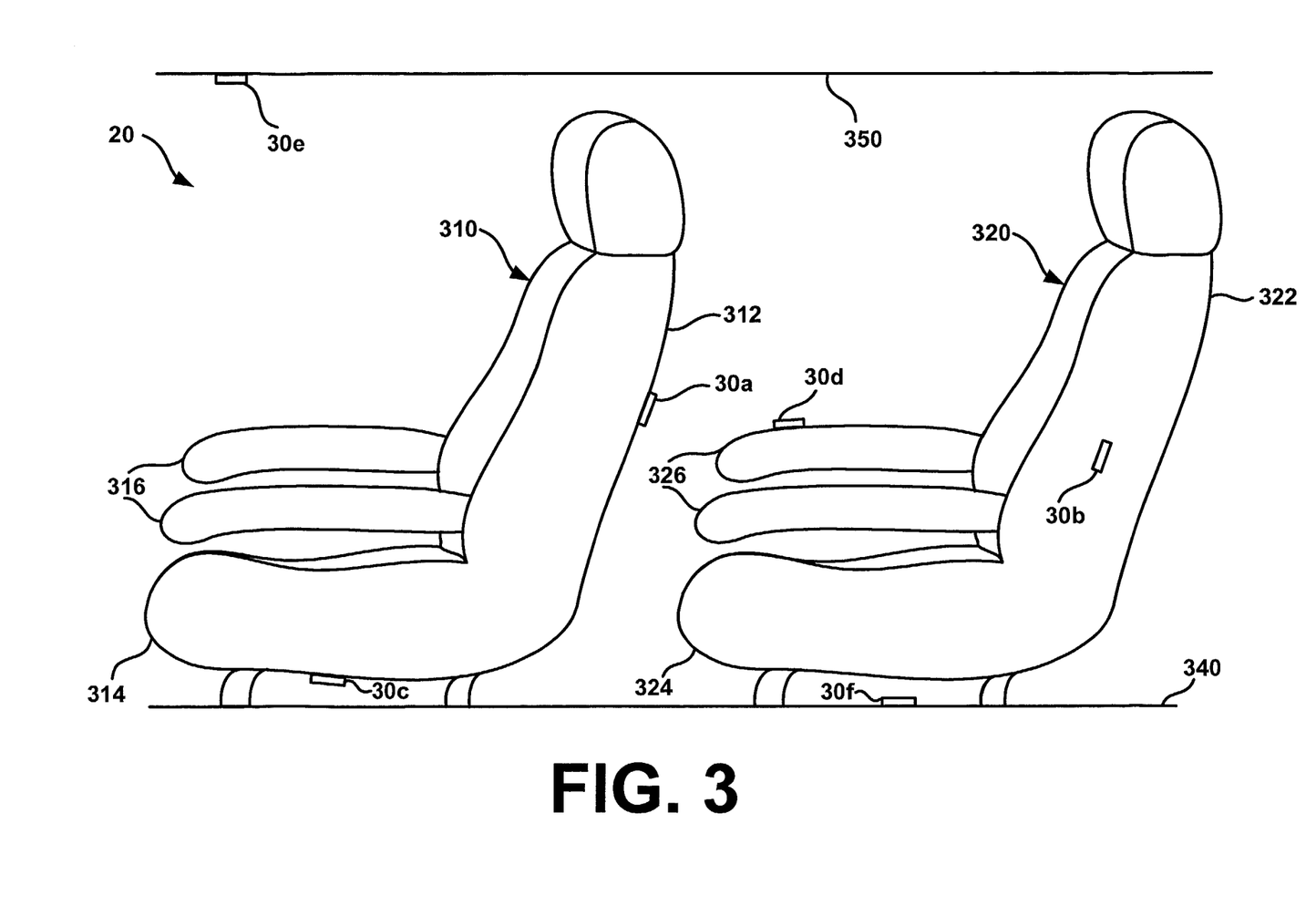
FIG. 3 illustrates exemplary locations for the panic device of FIG. 2 for use in the aircraft security system of FIG. 1.

Furthermore, although the base station 70 is shown in direct communication with the wireless interface 60 in FIG. 3, the emergency signal may alternatively pass through any number of intermediate devices before reaching the base station 70. To illustrate, in an exemplary scenario, the wireless interface 60 may send the emergency signal to a satellite, which may subsequently forward the emergency signal to the base station 70.

H. Exemplary Data Processing

Once the base station 70 receives the emergency signal, data included within the emergency signal (e.g., panic data, aircraft data) may be extracted through the use of demodulation and/or filtering mechanisms. The panic data and/or aircraft data may then be provided to an emergency dispatcher, who may forward the data to authorities such as the Federal Bureau of Investigation (FBI), the Federal Aviation Administration (FAA), the local police, or the military. These authorities may then use the information contained within the panic data and/or aircraft data to determine the type and severity of the emergency aboard the aircraft 14.

Additionally, once the data has been extracted from the emergency signal, it may be stored in one or more airline databases that include identification information about passengers aboard the aircraft 14. A variety of data may be included within the identification information, such as a passenger's name, address, flight number, airline name, and time and date of the flight departure and arrival. The airline database(s) may have a front-end interface (e.g., keypad, touch-screen display) that enables a user to query the database(s) using information such as the date and time of the flight, or the airline name and flight number. Additionally, or alternatively, the user may use a computer or hand-held device to query the database via the interface.

As described previously, the location of the activated panic device 30 may be determined by including the number of the seat associated with the panic device 30 within the panic data. Additionally, general information about the flight (e.g., airline name, flight number, time and date of flight departure and/or arrival, etc.) may be added to the panic data by the panic device 30 or control device 50. In the present embodiment, the panic data may then be provided to an airline database to find the identification information for the passenger assigned to the seat associated with the activated panic device 30. Additionally, the panic data may be used to obtain the identification information for any of the other passengers aboard the aircraft 14.

Furthermore, data processing of media transmissions of the passenger compartment 20 may be used for identifying individuals aboard the aircraft 14. For example, video recordings may help verify that the passenger associated with a seat having an activated panic device 30 is actually the passenger who activated the panic device 30. Additionally, during an emergency such as a hijacking event, video and audio recordings may be used to determine the identity of the hijackers, which may enable authorities to respond more effectively to the emergency.

Once the identity of an individual aboard the aircraft 14 is determined (e.g., via the identification information or a media transmission), this information may be provided to one or more records databases to determine additional classification information about the individual. Examples of records databases that may be utilized with the present embodiment include a driver's license or state identification database, a 911 database, a police database, an FBI database, and a credit database. Exemplary classification information that may be obtained from records databases may include the passenger's name, aliases, home addresses, age, height, eye color, criminal record, citizenship, and immigration status. It should be understood that the airline database and records database may utilize any type of standard storage mechanism (e.g., relational database, read-only memory (ROM), random access memory (RAM), etc.), and that any type of identification and classification information may be stored within these databases.

II. Exemplary Locations for the Panic Device

Turning now to FIG. 3, exemplary locations for the panic device 30 within the passenger compartment 20 of the aircraft 14 are shown. In the present embodiment, the passenger compartment 20 may have a first seat 310 and a second seat 320 attached to a floor 340. Additionally, a ceiling 350 may be above the seats 310, 320. Furthermore, the first and second seats 310, 320 may each have upper cushions 312, 322, lower cushions 314, 324, and armrests 316, 326, respectively. It should be understood that although two seats 310, 320 are shown in the present embodiment, any number of seats may be utilized within the passenger compartment 20.

Furthermore, exemplary panic devices 30*a–f* are shown in FIG. 3. Panic devices 30*a–f* may be substantially similar to the previously described panic device 30. As shown in FIG. 3, the panic devices 30*a–f* may be located in any number of locations within the passenger compartment 20. To illustrate, panic device 30*a* is attached to the back of the upper cushion 312, and panic device 30*b* is attached to the side of the upper cushion 322. Additionally, panic device 30*c* is attached to the bottom of the lower cushion 314, and panic device 30*d* is attached to the top of the armrest 326. Also, panic device 30*e* is attached to the ceiling 350 above the first seat 310, and panic device 30*f* is attached to the floor 340 below the second seat 320.

Thus, it should be understood that the panic device 30 may be located anywhere within the passenger compartment 20. For example, in alternate embodiments, the panic device 30 may be located on a pop-up armrest panel associated with the armrest 316, a fold-out tray attached to the back of the upper cushion 312, or a wall adjacent to the first seat 310. It should be further understood that although multiple panic devices are shown for each seat 310, 320, any number of panic devices (e.g., one panic device per seat) may be associated with each seat in the passenger compartment 20. Additionally, although the panic devices 30*a–f* are shown as buttons in FIG. 3, they make take any mechanical or electrical form. Furthermore, each of the panic devices 30*a–f* may be networked together or connected separately via a wireless or physical connection to the control device 50.

III. Exemplary Method of Passenger Reporting of Emergencies

Figure 4:
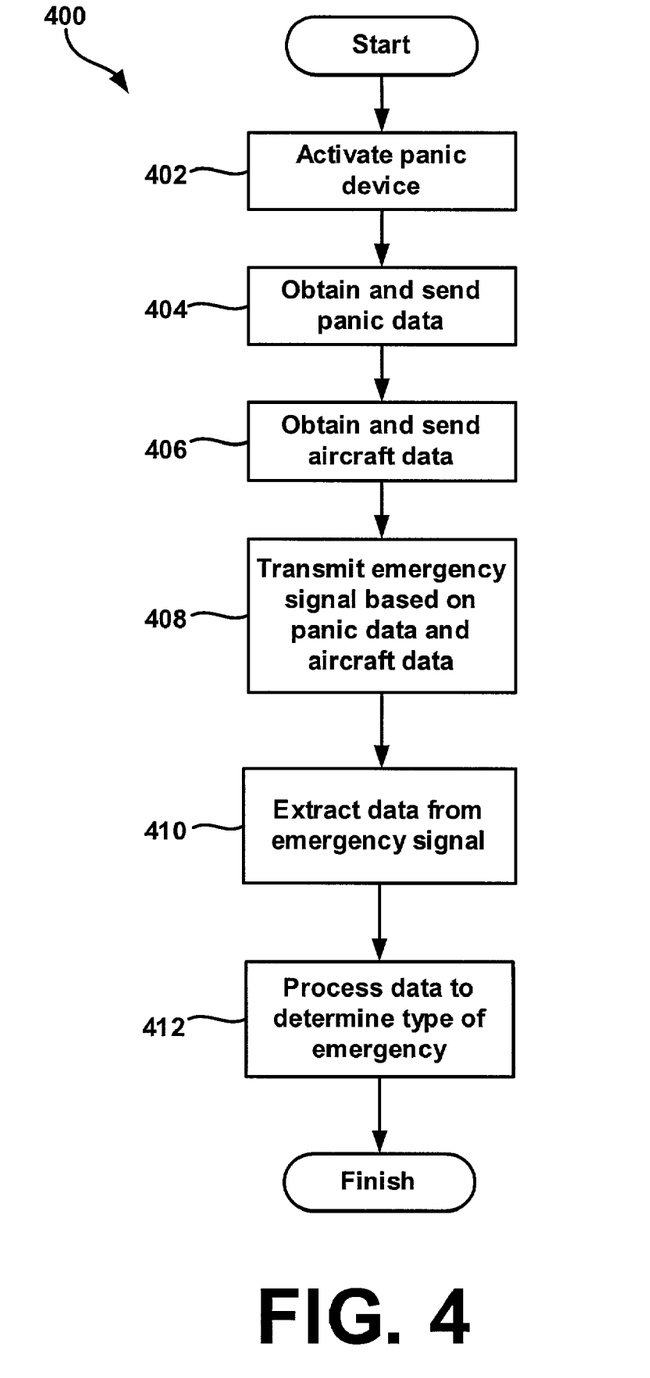
FIG. 4 is a flow chart illustrating an exemplary method of reporting an emergency using the aircraft security system of FIG. 1.

Turning now to FIG. 4, a flow chart shows an exemplary method 400 of reporting an emergency aboard the aircraft 14. In step 402, a passenger may activate the panic device 30. As described earlier, this may be accomplished in a number of ways, such as by changing the selection state of the selection mechanism 32 from "off" to "on", or inputting data to the input interface 34.

In step 404, panic data may be obtained by the panic device 30 and sent to the wireless interface 60 via the control device 50. Alternatively, the panic data may be sent directly from the panic device 30 to the wireless interface 60. Similarly, in step 406, aircraft data may be obtained by the aircraft data interface 40 from the aircraft subsystems and media devices. The aircraft data may be sent directly to the wireless interface 60, or sent indirectly via the control device 50. In steps 404 and 406, the control device 50 may combine or process the panic data and/or aircraft data. Further, it should be understood that steps 404 and 406 may occur simultaneously or in any order.

In step 408, the wireless interface 60 may transmit an emergency signal outside of the aircraft 14 that is indicative of the panic data and/or aircraft data received in the previous steps 404, 406. The emergency signal may utilize a CDMA air interface, though other wireless technologies may alternatively be utilized.

In step 410, the base station 70 may receive the emergency signal and extract data (e.g., panic data and aircraft data) from the emergency signal. This may be accomplished through the use of demodulation and/or filtering mechanisms. Furthermore, in the following step 412, the data may be processed to determine what type of emergency, if any, exists aboard the aircraft 14. An airline database storing identification information, a records database storing classification information, or any other such mechanism may be utilized for determining additional information about individuals aboard the aircraft 14. For example, media transmissions or identification information may be used to determine the identity of individuals aboard the aircraft 14. This identification information may be further used to obtain classification information (e.g., criminal record, immigration status, etc.) for these individuals.

It should be understood that the steps in the present method 400 may occur in a different order, or that more or fewer steps may be utilized. For example, in an alternate embodiment, authorities on the ground may send information back to the panic device 30 via the base station 70, wireless interface 60, and control device 50. This information may be shown on the display 38 and may instruct a passenger on how to deal with an emergency aboard the aircraft 14. Such two-way communication may be beneficial in a number of different situations. To illustrate, in an exemplary scenario, a first passenger may be suffering from an emergency medical condition (e.g., heart attack, stroke, etc.). A second passenger may use his panic device 30 to report the emergency. Medical professionals on the ground may provide the second passenger with advice on how to treat the first passenger. In another exemplary scenario, hijackers may have seized control of the aircraft 14. A passenger may activate the panic device 30 and subsequently receive instructions from the ground on how to handle the hijack situation.

The present embodiments may provide a number of advantages. The aircraft security system 10 may enable a passenger to report an emergency aboard the aircraft 14 to authorities on the ground. By notifying authorities about the type of emergency, these officials may be able to provide an appropriate response and save lives by preventing a catastrophic event aboard the aircraft 14. Additionally, the use of two-way communication between a passenger on the aircraft 14 and authorities on the ground may enable authorities to instruct the passenger on how to handle the emergency. Further, in the case of a catastrophic event aboard the aircraft 14 (e.g., an explosion, decompression), the recording of panic data and aircraft data may provide investigators with information about how the disaster occurred, which may prevent future air tragedies from occurring. Furthermore, in the case of a hijacking or terrorist attack, panic data and aircraft data may serve as useful evidence during prosecution of suspected criminals.

It should be understood that a wide variety of changes and modifications may be made to the embodiments of the aircraft security system 10 described above. For example, in an alternate embodiment, the panic device 30 and/or aircraft data interface 40 may communicate directly with the wireless interface 60, or each of these components 20, 40 may include their own wireless interface 60. Additionally, the input interface 34 and display 38 may alternatively be omitted from the aircraft security system 10. Also, the display 38 may be replaced or enhanced with a component that utilizes audio instead of video technology. In addition, the control device 50 and/or wireless interface 60 may alternatively be included within the passenger compartment 20. Furthermore, a variety of other air interface protocols may alternatively be used, including $3^{rd}$ Generation wireless (3G), TDMA, Gigabyte System Network (GSM), Advanced Mobile Phone Service (AMPS), Total Access Communications System (TACS), a satellite based communications system such as Iridium, 2-way radio communications (e.g., AM, FM, PSK) and various hybrid CDMA/TDMA air interface protocols. Additionally, certain components, functions, and operations of the aircraft security system 10 of the present embodiments may be accomplished with hardware, software, or a combination of the two. It is therefore intended that the foregoing description illustrates rather than limits this invention, and that it is the following claims, including all equivalents, that define this invention:

What is claimed is:

1. An aircraft security system comprising:
a panic device fixed to an aircraft and accessible to and activated by a seated passenger, wherein the panic device is within a passenger compartment of the aircraft;
a wireless interface associated with the aircraft that responds to activation of the panic device by transmitting an emergency signal outside of the aircraft; and
a control device in communication with the panic device and the wireless interface, wherein the panic device sends panic data to the control device, and wherein the panic device receives via the control device information for presentation to the seated passenger in response to the emergency signal transmitted outside of the aircraft.

2. The system of claim 1, wherein the emergency signal transmitted by the wireless interface is indicative of the panic data.

3. The system of claim 1 further comprising an aircraft data interface in communication with the control device, wherein the aircraft data interface sends aircraft data to the control device.

4. The system of claim 3, wherein the emergency signal transmitted by the wireless interface is indicative of the panic data and the aircraft data.

5. The system of claim 3 wherein the aircraft data comprises telemetry data for the aircraft.

6. The system of claim 5, wherein the telemetry data comprises an indication selected from the group consisting of an indication of a location coordinate of the aircraft, an indication of a orientation and routing of the aircraft, an indication of a horizontal and a vertical velocity of the aircraft, an indication of an origination and destination of the aircraft, and an indication of an altitude of the aircraft.

7. The system of claim 3, wherein the aircraft data comprises an indication selected from the group consisting of an indication of fuel status, an indication of engine status, an indication of computer status, an indication of navigation status, an indication of communications status, an indication of Global Positioning System status, an indication of radar status, an indication of transponder status, an indication of radio status, an indication of power generation and distribution status, an indication of flight control surfaces status, an indication of wing control status, an indication of rudder control status, an indication of landing gear status, an indication of flight management status, an indication of decompression status, an indication of automatic pilot status, an indication of hydraulics status, an indication of avionics status, an indication of sudden loss of altitude, and an indication of an explosion.

8. The system of claim 3 wherein at least a portion of the aircraft data is generated by Built In Test Equipment.

9. The system of claim 3, wherein the aircraft data comprises a media recording of the passenger compartment.

10. The system of claim 1 further comprising a base station that receives the emergency signal from the wireless interface.

11. The system of claim 10, wherein the wireless interface comprises a Personal Communications Services mobile station and the base station comprises a Personal Communications Services base station having a transceiver for communicating with the wireless interface.

12. The system of claim 10, wherein the base station extracts data from the emergency signal, and the data is sent to an emergency dispatcher.

13. The system of claim 12, wherein the data comprises at least one of panic data and aircraft data.

14. The system of claim 1, wherein the aircraft comprises a commercial airliner.

15. The system of claim 1, wherein the panic device is connected to a network of panic devices within the passenger compartment, and the network of panic devices is connected to the control device.

16. The system of claim 1, wherein the emergency signal is transmitted over a code division multiple access air interface.

17. The system of claim 1, wherein the aircraft further comprises a panic indicator that indicates the activation of the panic device.

18. The system of claim 17, wherein the panic indicator is prevented from indicating the activation of the panic device if a hijacking is occurring aboard the aircraft.

19. A method for reporting an emergency on an aircraft comprising:
   activating a panic device fixed to the aircraft by a seated passenger within a passenger compartment of the aircraft;
   sending panic data by the panic device to a control device;
   transmitting an emergency signal outside of the aircraft in response to the seated passenger activating the panic device, wherein the emergency signal is indicative of the panic data sent from the panic device; and
   sending to the panic device via the control device information for presentation to the seated passenger in response to the emergency signal transmitted outside of the aircraft.

20. The method of claim 19, wherein the emergency signal is further indicative of aircraft data determined within an aircraft data interface.

21. The method of claim 20 further comprising receiving the panic data and the aircraft data at the control device.

22. The method of claim 19 further comprising extracting data from the emergency signal and sending the data to an emergency dispatcher.

23. The method of claim 22, wherein the information for presentation to the seated passenger includes instructions from the emergency dispatcher for the seated passenger on how to respond to the emergency.

24. The method of claim 22 further comprising determining a type of the emergency from the data extracted from the emergency signal.

25. The method of claim 22 further comprising using the data to obtain identification information from an airline database.

26. The method of claim 25 further comprising using the identification information to obtain classification information from a records database.

27. A panic device for use in an aircraft, wherein the panic device is fixed to the aircraft, comprising:
   a selection mechanism activated by a seated passenger during an emergency, wherein the selection mechanism has a plurality of possible selection states; and
   a transceiver that receives panic data indicating the emergency from the selection mechanism and sends the panic data to a control device, and wherein the transceiver further receives information from the control device for presentation to the seated passenger in response to an emergency signal transmitted outside of the aircraft, the emergency signal being indicative of the panic data.

28. The panic device of claim 27, wherein the selection mechanism comprises at least one of a knob, a switch, a dial, and a button.

29. The panic device of claim 27, wherein the selection mechanism comprises an input interface for allowing the seated passenger to input the panic data.

30. The panic device of claim 29, wherein the input interface comprises at least one of a keypad, handwriting recognition area, and touch-screen display.

31. The panic device of claim 27 further comprising a display for presenting the information to the seated passenger, wherein the information includes at least one message regarding the emergency.

32. The panic device of claim 27, wherein the panic device has a location selected from the group consisting of a cushion on a seat, an armrest on a seat, a pop-up armrest panel on a seat, a ceiling above a seat, a floor below a seat and a wall adjacent to a seat.

33. The panic device of claim 27, wherein the panic data is selected from the group consisting of an indication of a bomb threat, an indication of a hijacking event, an indication of a pilot disabled, an indication of a passenger injury, an indication of a crew injury, an indication of a death, an indication of a request for medical attention, and an indication of a weapon threat.

34. The panic device of claim 27 further comprising an inadvertent activation prevention mechanism.

* * * * *